UNITED STATES PATENT OFFICE.

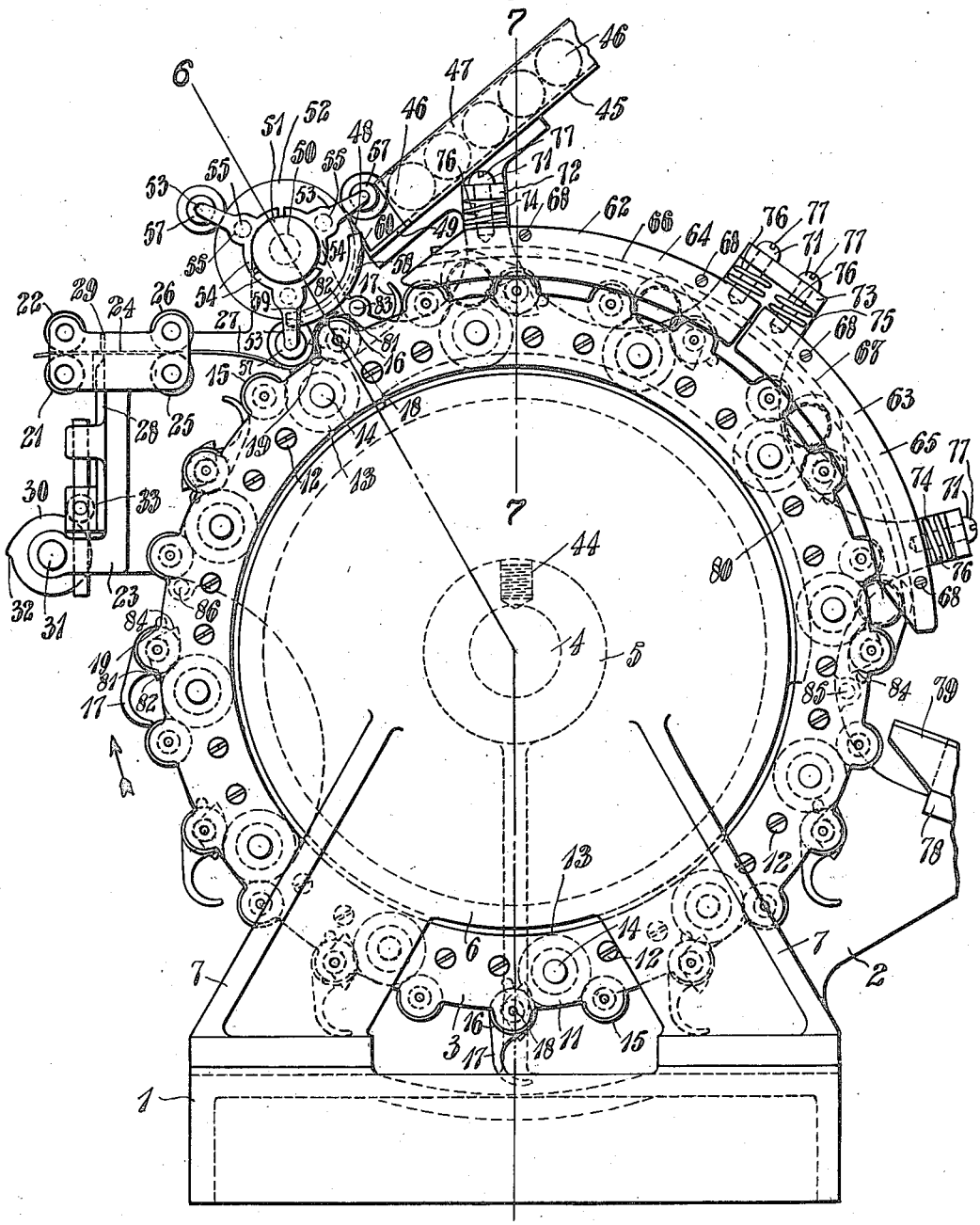

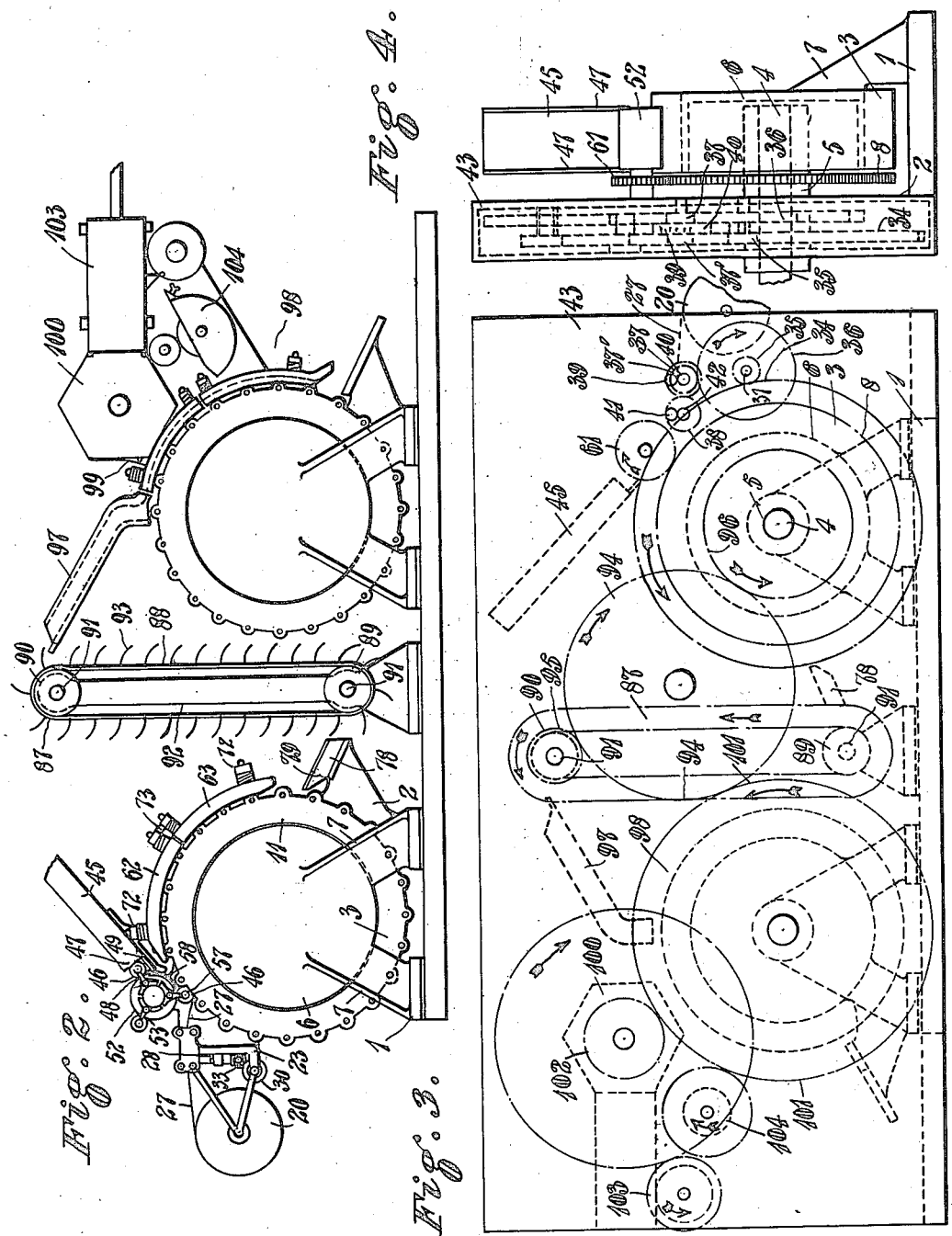

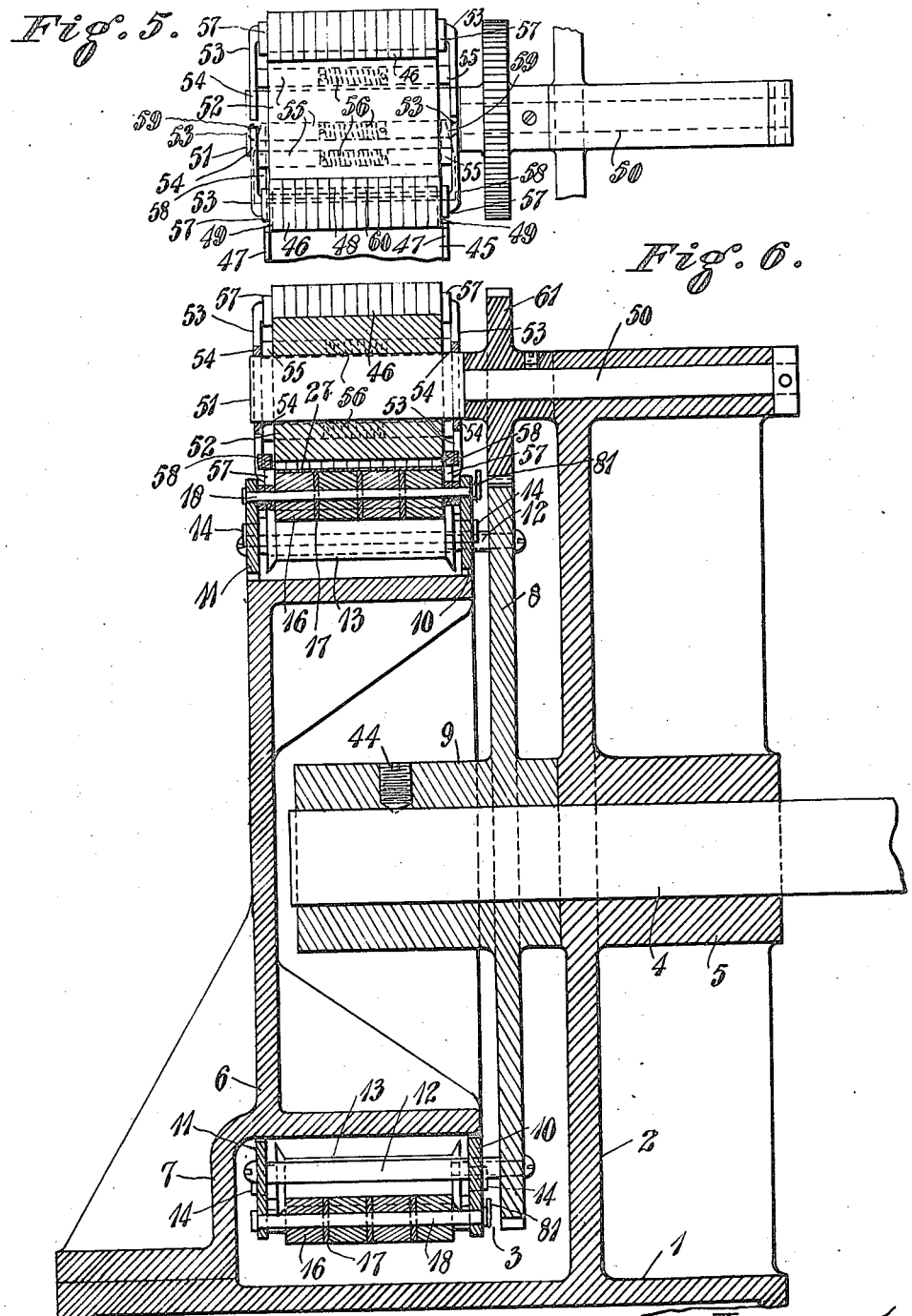

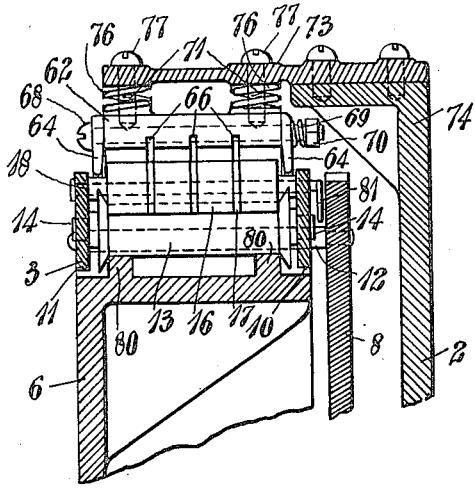
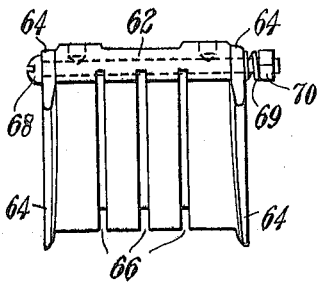
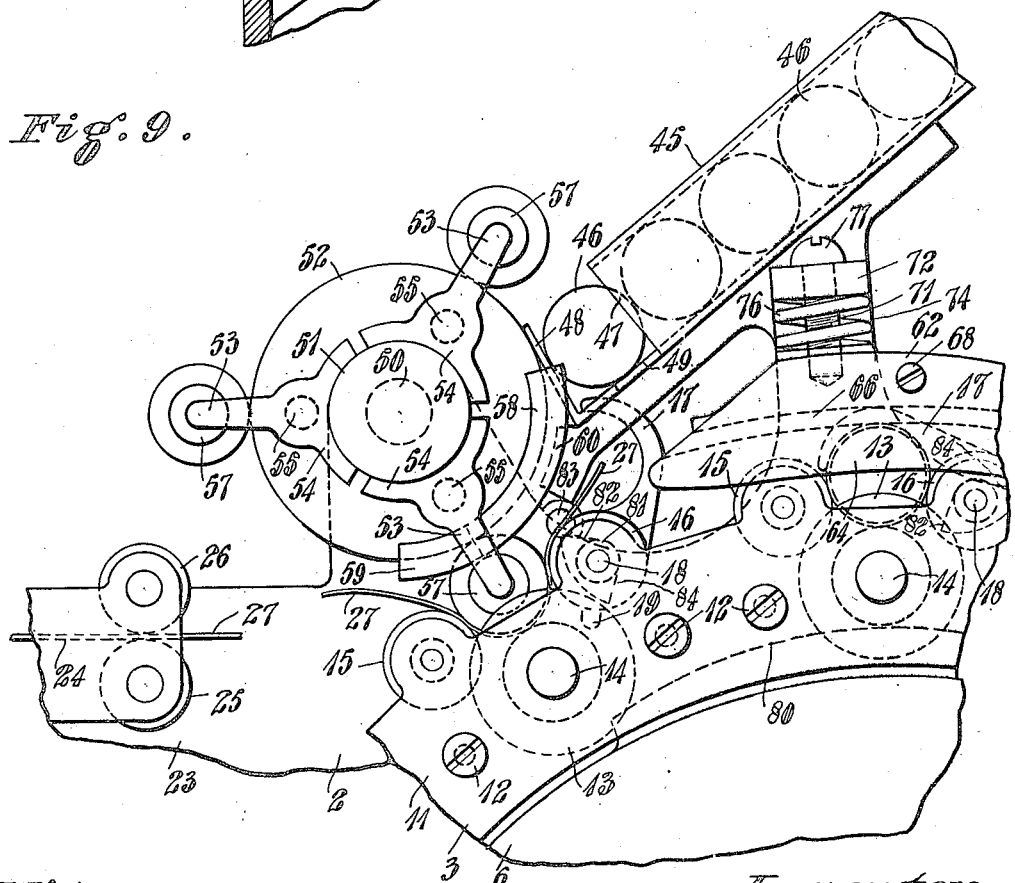

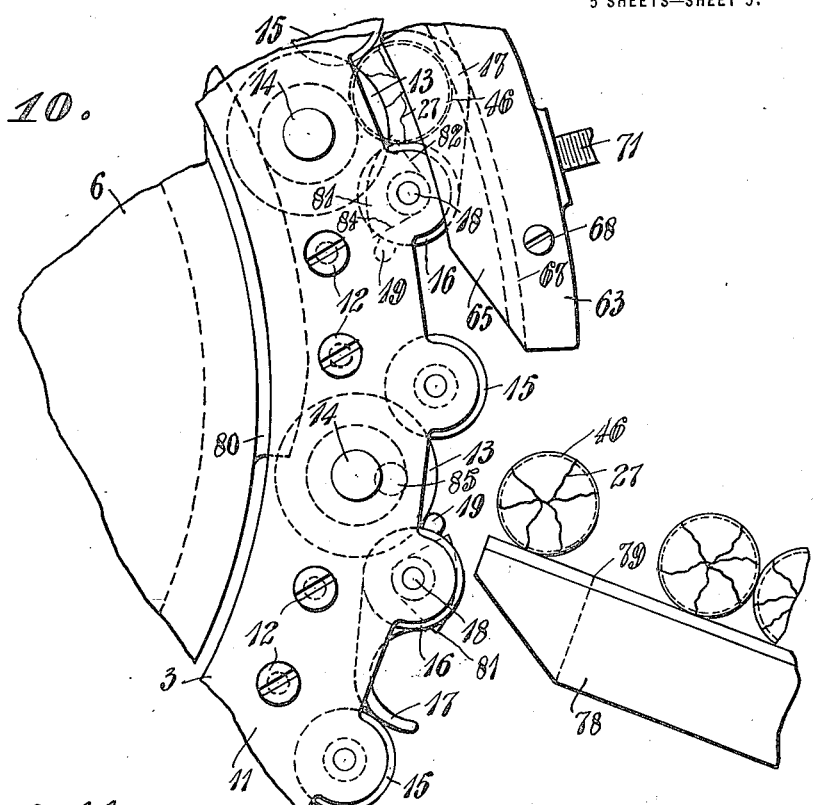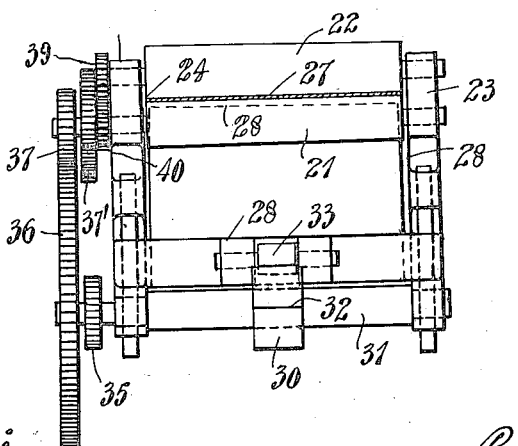

PAUL VARGA, OF CINCINNATI, OHIO, ASSIGNOR TO THE AROMINT MANUFACTURING COMPANY, OF CINCINNATI, OHIO, A CORPORATION OF OHIO.

WRAPPING MACHINE.

1,424,534.     Specification of Letters Patent.    Patented Aug. 1, 1922.

Application filed November 7, 1918. Serial No. 261,474.

*To all whom it may concern:*

Be it known that I, PAUL VARGA, a subject of the King of Hungary, and residing at Cincinnati, in the county of Hamilton and State of Ohio, have invented certain new and useful Improvements in Wrapping Machines, of which the following is a specification.

My invention relates to wrapping machines, and its object is the more efficient wrapping of cylindrical packages, especially of the kind consisting of a plurality of substantially flat cylindrical articles, such as lozenges or the like, arranged with their substantially flat sides together with the wrapper crimped over the ends. Other objects will hereinafter more fully appear.

My invention consists in the combination of parts and in the details of construction and arrangement of parts as will hereinafter be more fully described and claimed.

In the drawings:

Fig. 1 is a front elevation of a wrapping machine constructed according to my invention;

Fig. 2 is a similar view on a smaller scale showing how such machines are operated in series, whereby an additional wrapper or label is applied to the package;

Fig. 3 is a rear elevation corresponding to Fig. 2, showing the operative connections between the various parts of the machines;

Fig. 4 is an end elevation of the same;

Fig. 5 is a partial plan view of the feeding means;

Fig. 6 is a cross-section on planes corresponding to the line 6—6 of Fig. 1;

Fig. 7 is a partial cross-section on a plane corresponding to the line 7—7 of Fig. 1;

Fig. 8 is a detail end elevation of one of the pressers;

Fig. 9 is a partial side elevation illustrating the operation of the feeding means and the initial wrapping operation;

Fig. 10 is a similar partial section illustrating the operation of the delivering means; and Fig. 11 is a partial left end elevation of the machine, further illustrating the wrapper-supply means.

As shown herein, the base 1 has extending up from its rear part the pedestal 2. The rotor 3 is in front of the pedestal 2 and is fixed on the driving shaft 4 that extends horizontally back through a bearing 5 in the pedestal 2. In front of the rotor 3 is the stator 6 supported upon the front part of the base 1 by a bracket 7 extending down from the front of the stator.

The rotor 3 comprises the gear 8 attached to and concentric with the rear part of a hub 9 by which the rotor is attached to the shaft 4 as before mentioned; and a concentric framework made up of the rear ring 10 and the front ring 11 closely surrounding the stator 6 adjacent to its rear and front sides, respectively, and fixed together in these relative positions by struts 12 fixed in and projecting forwardly from the gear 8 of the rotor, near the periphery thereof, and at suitable intervals therearound to admit between some of them the circumferentially equally spaced flanged rollers 13, each having short end shafts 14 journaled in the rings 10 and 11, so that these rollers 13 turn on front-to-rear axes between the rings with the peripheries of their flanges at their ends clearing the outer surface of the stator 6 as do the rings 10 and 11. Somewhat above each flange roller 13 and at one side thereof, the plain roller 15 is journaled in the rings 10 and 11 in a similar manner; this plain roller 15 being short enough to lie between the flanges of the roller 13. Substantially an equal distance above the roller 13, and at the other side thereof and at the same distance, are the roller-sections 16 and fingers 17 alternating with each other in a series across the frame on a shaft 18 journaled in the frame-rings 10 and 11; the fingers 17 being fixed to said shaft 18 but the roller-sections 16 being loose thereon. Each finger 17 is relatively thin, and is curved in its radial extension from its main part between the roller sections 16, so that if it swings over toward the plain roller 15 across the space over the flanged roller 13 it forms an arch across this space. Except for the interposition of these fingers 17, the roller-sections 16 correspond to the plain roller 15 at the other side; and these rollers and fingers are so relatively proportioned and positioned that with the fingers 17 arching over to the roller 15, the space under the fingers and between the rollers 13 and 15 and the roller-sections 16 admits snugly the cylindrical package that is to be wrapped, and the under side of each finger is curved substantially to a semi-circle substantially concentric with the package when it rests in this space and substantially conforming to half of the circumference of the package. Substantially diametrically opposite from its hooked part, each finger 17 has the radial lug 19 short enough to clear the adjacent surface of the middle part of the flanged roller 13 when the fingers 17 swing across the space as just described; but long enough to be materially engaged by the package when the package enters the space while the finger 17 is occupying a position on the side of its axis remote from said space.

The wrapping material is supplied in the form of a continuous web from the reel 20 (Fig. 2) by being drawn between two supply-rollers 21 and 22 journaled horizontally in an extension 23 on one side of the pedestal 2; said rollers being in upright alinement on front-to-rear axes and projecting the wrapping material, where it emerges from them, through a horizontal guideway 24 in the extension 23 over toward the upper part of the rotor 3 and between another pair of similarly arranged and supported auxiliary rollers 25 and 26 so close to the rotor 3 that, as the rollers and fingers just described are carried up over the top of the stator 6, these rollers and fingers come very close to the rollers 25 and 26 and the wrapping material emerging therefrom. As herein shown, the machine is so designed that it operates by rotating the rotor from left to right or clockwise, as indicated by the arrows in Figs. 1 and 2; and in accordance with this, the roller-sections 16 and fingers 17 are at the right of the flanged roller 13 as these parts are carried up to the top and to the right. The wrapper-supply means just mentioned is accordingly placed at the left.

The wrapping material 27 is wide enough to extend axially past the end of the row of articles to be wrapped; these extensions being crimped down against the ends as will presently be described. The wrapper-supply means comprises the cutter 28 with its sharp edge projecting up into an opening below the wrapper guide 24 below a transverse narrow slit 29 and periodically actuated by a cam 30 on a shaft 31 journaled in the lower part of the extension 23 which also guides the cutter 28. This cam is circular, except for a small projection 32 on its periphery; and the cutter 28 has a roller 33 constantly bearing on the periphery of the cam 30 which raises the cutter by engagement with the roller 33 to sever the wrapping material 27.

The cam 30 is driven through the medium of the large gear-wheel 34 fixed on the driving shaft 4 at the rear (Figs. 3 and 4) and a pinion 35 fixed on the shaft 31. A gear-wheel 36 is also fixed on this shaft 31 and meshes with the pinion 37 on the shaft of the lower supply roller 21; which roller 21 also has another gear-wheel 37' turning with it and meshing with a gear-wheel 38 preferably of slightly less diameter fixed on the shaft of the lower auxiliary roller 25. The upper supply roller 22 has on its shaft the gear 39 meshing with the gear 40 on the shaft of the lower supply roller 21, and the upper auxiliary roller 26 has on its shaft the gear 41 meshing with the gear 42 on the lower auxiliary roller 25 (Figs. 3 and 4.)

These last mentioned gears, as well as others, subsequently to be described, are enclosed in a box 43 (Figs. 3 and 4) to the rear of the pedestal 2 with their shafts bearing in the rear and front walls of the box. The rotor 3 is detachably secured to the shaft 4 by the set-screw 44 so that when the stator 6 is removed the rotor may be removed for cleaning, or for other purposes.

With the various gear-wheels properly proportioned, the supply rollers 21 and 22 will constantly draw wrapping material 27 from the reel 20, and the auxiliary rollers 25 and 26 preferably turning slightly faster will keep the material stretched along the guide 24 so that it may be cleanly cut by the cutter 28 at the proper intervals in accordance with the passage of successive sets of wrapping rollers and fingers of the rotor 3. The length of the wrapper is, of course, governed by the frequency with which the cutter 28 is forced up relatively to the rate of travel of the wrapping material as caused by the rollers 21, 22, 25 and 26. As shown in Fig. 3, the gears are so proportioned that the cutter 28 is operated twelve times for each revolution of the rotor; thus supplying a wrapper for each one of the twelve sets of wrapping rollers on the rotor. The auxiliary rollers 25 and 26 not only keep the material stretched ready for cutting, but complete the delivery of the cut wrapper to the wrapping rollers on the rotor 3, as will readily be understood on inspection of Fig. 1.

The feeding means comprises the chute 45 inclined from the right down over the pressing means. The lozenges or other articles 46 occupy this chute 45 in successive rows thereacross with the substantially flat sides of the articles together; so that each row across the chute will be the contents of one of the packages to be wrapped. Means for supplying such articles automatically in such an arrangement in the chute is disclosed and claimed in my Patent No. 1,220,801, dated March 27, 1917. Such means or other suitable means may be employed for this purpose in connection with my present invention and need not be specifically described herein.

This chute 45 has the sides 47 which do not extend all of the way down to its lower end 48, and the bottom 49 of the chute has its lateral edges cut away past the lower ends of the sides 46 (Fig. 5.) Preferably, the distance between the lower end of the side 47 and the lower end 48 of the chute is a little less than the diameter of one of the articles; so that the lowermost row of articles is held up by the slight engagement of the terminal articles with the lower end parts of the chute sides. The shaft 50 is journaled in the top of the pedestal 2 and has the enlarged part 51 projected forward with the cylinder 52 fixed thereon. This cylinder 52 is of about the length of a row of the articles 46, and the enlargement 51 of the shaft 50 extends past the ends of the cylinder. Three arms 53 at each end of the cylinder extend radially outward at equal intervals therearound and each has a segmental inner end 54 passing part of the way around the extension of the shaft part 51 and having a bearing thereon. Each arm 53 has a shank 55 extending into a respective bore through the cylinder parallel to its axis; the shanks of opposite arms extending in the same bore and being connected together inside the bore by a respective tension-spring 56. The outer end of each arm carries a platen 57 adapted to make gripping contact with the terminal ones of a row of lozenges or other articles 46 when the arms are drawn toward each other by the springs 56. It will be seen that the radial positions of the arms are maintained by their ends 54 bearing on the extensions of the shaft part 51 along which they are allowed to slide in an axial direction.

This cylinder 52 with these arms is positioned between the lower end of the chute 45 and the wrapper-supply means with the lower chute end 48 substantially tangent to the cylinder at its upper end; the entire arrangement being such that a pair of arms thus drawn together may clamp and lift a row of the articles 46 as they swing around counter-clockwise; carrying the articles over and down into the space between the wrapping rollers and onto the wrapper 27 projected thereover by the supply means, as clearly seen in Figs. 1 and 9.

The segmental cams 58 are located along the lower right-hand quarter of each end of the cylinder 52; the lower end 59 of each cam (Fig. 5) being inclined inwardly to the left, so that as a pair of arms 53 swing down into the space between a set of wrapping rollers, the arms ride apart axially on the lateral sides of these cams 58 and release the articles 46 into the space between the wrapping rollers. The arms are thus held separated until they again reach their position where they are to grip the next row of articles 46 which they do by sliding over the upper ends of the cams 58. These cams 58 are fixed on a bar 60 that extends across a downward projection of the chute-supporting means.

This cylinder 52 is rotated at the proper speed by means of a pinion 61 fixed on the shaft 50 just to the rear of the enlargement 51 and meshing with the large gear 8 of the rotor.

The pressing means comprises the segmental pressers or shoes 62 and 63 arranged in succession over and down to the right of the rotor 3. Each shoe or presser 62 or 63 is of inverted channel shape with the sides 64 and 65, respectively, of the channel flanking the ends of the rollers 15 and roller-sections 16 passing thereunder and having the under surface substantially straight across the channel except that it is provided with the longitudinal grooves 66 or 67, respectively, admitting the upper parts of the fingers 17 when these fingers extend across the wrapping space, as seen in Fig. 1. Each of these pressers 62 and 63 preferably has its sides separate from its middle part and yieldably held together by bolts 68 loosely passing transversely through the sides and main part and having helical springs 69 around them and compressed against the rear side 64 or 65, as the case may be, by nuts 70. The middle main part of each presser has radial screws 71 in pairs at opposite ends extending through forwardly projecting brackets 72 and 73 (see Figs. 1, 2 and 7) on upward extensions 74 and 75, respectively, of the pedestal 2. Between these pressers and their brackets 72 and 73 around the respective screws 71 are compressed helical springs 76 (Fig. 7.) The slotted heads 77 of the screws 71, bearing against the outer parts of the brackets 72 and 73, limit the inward extension of the pressers under the action of the springs 76, and permit adjustment of this inward extension.

The upper end of the presser 62 is close to the chute 45 and cylinder 52, and is inclined downward so that it permits the advanced end of the wrapper 27 to pass above it; while the fingers 17 are permitted to swing upward through the adjacent end parts of the grooves 66 during the feeding operation hereinbefore alluded to. The sides 64 of this presser 62 are flared and their terminal parts are upwardly curved and rounded toward the chute and cylinder at this end (Fig. 8,) but throughout the rest of the length of this presser and throughout the entire length of the succeeding presser 63 the sides are normally substantially parallel. The lower end of the presser 63 has its inner side inclined away from the rotor, and a short distance below this is the upper end of the delivery chute 78 which has slots 79 in its end down through which the fingers 17 may swing after they are released from under the presser 63, to thereby deliver the wrapped package to the chute 78.

The stator 6 has outer segmental ribs 80 extending from near the feeding position around near to the delivering position. The terminal parts of these ribs incline slightly radially inwardly, but the ribs are of uniform maximum height throughout an angular extent equal to that of the effectively operating main middle parts of the pressers 62 and 63. These ribs are of such height that the middle parts of the flanged rollers 13 contact with the peripheral parts of the ribs throughout this extent of uniform maximum height of the ribs. The stator 6 may be limited in its circumferential extent to that of these ribs; the principal function of the stator being to support these ribs or equivalent means for contacting with the rollers 13 or other part of the traveling wrapping means to actuate this means during the wrapping part of its travel. But I prefer to make the stator completely cylindrical, as shown, because it thus practically closes the space under the wrapping means and prevents the falling of substances between the stator and rotor. Also, the finishing of the operative parts of the stator is more readily accomplished when it is in substantially complete cylindrical form. Also, it will be understood that the angular extent of the wrapping operation may be increased, if desired, in modifications of my invention, so that a greater angular extent of the stator would thus be utilized for coacting with the traveling wrapping means as just described.

The pressing means is preferably made up of the two separate pressers 62 and 63, as just described, because this permits the pressing means to more accurately adjust itself to the work by virtue of its yieldable mounting; and this also permits the yieldable sides 64 or 65 to more accurately adjust themselves to the package ends by virtue of their yieldable attachment to the main parts of the pressers by the transverse bolts and springs 69.

To positively swing the fingers 17 into their correct positions at various stages of their travel, the shaft 18 of each finger preferably has fixed to its rear end a dog 81 which has an advanced edge 82 standing approximately radially when the fingers have been partially raised by the dropping of the articles and wrapper onto their lugs 19, as shown by the dotted lines in Figs. 1 and 9. A pin 83 projecting forward from the pedestal 2 is engaged by this dog in this position so that further rotation of the rotor throws the fingers entirely across the articles and their wrappers; a partial stage of this operation being indicated in Fig. 9. At the other side of its shaft, the dog 81 has an advanced edge 84 that stands substantially radially when the fingers have been thrown into this last position; and a pin 85 projects forward from the pedestal 2 shortly below the level of the lower end of the lower presser 63 and inward therefrom radially far enough so that this other edge 84 of the dog strikes the pin 85 just after the fingers have been released from under the presser; thus throwing the fingers down through the slots 79 in the chute 78 and releasing the wrapped package into this chute. During their under and upward travel, these fingers may swing partially out of this position again; and to insure that they will have this position remote from the wrapping space and swung inward to pass under the lower end of the chute, I prefer to provide a third pin 86 at the left somewhat above the horizontal center line of the machine and projecting forward from the extension 23 (Fig. 1).

The chute 78 delivers wrapped packages to a conveyor 87 (Fig. 2) which comprises a belt 88 running around a lower pulley 89 and an upper pulley 90 in substantially vertical alinement on front-to-rear shafts 91 in an upright frame 92; said belt having a series of outwardly extended blades 93 curving slightly upwardly on the side next to the chute 74; so that each blade 93 receives one of the packages from the chute. The upper pulley 90 is driven through the medium of the idler gear 94 meshing with a gear 95 on the upper shaft 91 and with a gear 96 on the driving shaft 4 (Fig. 3). As the blades 93 pass over the upper pulley 90 they deliver the wrapped packages to the labeling chute 97 which forms part of the labeling machine 98, receiving the packages from the chute 97 between wrapping rollers arranged according to the principle of my invention and as just described in the wrapping machine; but this labeling machine 98 applies, by means of these wrapping rollers, wrappers in the form of labels 99 to the wrapped packages, which labels are taken from a suitable wrapper or label-supply means 100, which, together with other variations from the wrapping machine herein, are disclosed and claimed in my co-pending application of even date.

Briefly, the operation of the wrapping machine, constructed as described, is as follows: The machine is kept in motion through the medium of its driving-shaft 4 which, it will be understood, may be driven by any suitable means. This rotate the rotor 3 carrying the traveling wrapping means successively under the feeding means. At the same time, the wrapper-supply means constantly feeds wrapping material from the reel 20 and cuts off a wrapper therefrom for each wrapping means passing under the chute; the motion of the parts being so regulated that the cut-off wrapper is passed out by the auxiliary rollers 25 and 26 over the wrapping means and under the chute, just before a pair of arms 53 places a row of articles down onto the wrapper to bear on the lugs 19 and partially raise the fingers 17, which are then thrown over by the coaction of the pin 83 with the dog 82, or by engagement of the backs of the fingers with the adjacent end of the presser 62, or both. The fingers, thus thrown over, lap the adjacent end of the wrapper over the row of articles ready to pass under the presser 62. As the wrapping means passes under this presser, the flanged roller 13 begins to be revolved by its contact with the ribs 80, and the contained articles, thus partially wrapped, are pressed down against this roller 13 and the lateral rollers 15 and 16 by the presser; so that the partially wrapped package and all of these rollers revolve and the other end of the wrapper is wound onto the package and caused to overlap the first end which is held snugly against the articles by the fingers 17 now traveling in the grooves 66 of the presser. At the same time, the flanges of the flanged roller 13 and the downwardly extending sides of the presser are crimping the axially extended parts of the wrapper down over the end of the package. The yieldableness of the pressers radially and of their sides axially causes this wrapping and crimping to be done neatly and smoothly, but at the same time avoids such excessive pressure at any time as to tear the wrapper or crush any of the articles. The package is revolved several times in its travel under the two pressers and when it emerges from the lower end of the lower presser 63, the fingers are thrown down by the coaction of their dog 81 with the pin 85, and the now completely wrapped package rolls down onto an approaching blade 93 of the upright conveyor 87, to be carried to the labeling machine and labeled in the manner fully described in my co-pending application hereinbefore referred to.

A large gear 101 (Fig. 3) on the driving shaft 4 of the second machine meshes with the idler gear 94 to drive the second machine, which gear 101 also meshes with a gear 102 to drive the label-supply means 103 and pasting means 104 of this other machine.

This other machine, for applying the labels, or wrappers which do not extend the full axial length of the package, also comprises some mechanism conforming to the principle of the present invention, as well as some distinct therefrom and which latter is claimed in the aforesaid co-pending application. Therefore, while certain constructional details are deemed preferable in connection with my invention, as particularly adapted for applying wrappers with crimped ends, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a wrapping machine, traveling wrapping means to rotatably support an article to be wrapped, and comprising rotary means juxtaposed to said article in an axial direction therefrom to crimp a wrapper projecting axially from said article during rotation of said article, means for feeding said article to said wrapping means, and means for supplying a wrapper between said article and said wrapping means.

2. In a wrapping machine, traveling wrapping means to rotatably support an article to be wrapped, and comprising rotary means juxtaposed to said article in an axial direction therefrom to crimp a wrapper projecting axially from said article during rotation of said article, means to press said article to said wrapping means during rotation of said article, means for feeding said article to said wrapping means, and means for supplying a wrapper between said article and said wrapping means.

3. In a wrapping machine, traveling wrapping means to support and cause rotation of an article to be wrapped, and comprising rotary means juxtaposed to said article in an axial direction therefrom to crimp a wrapper projecting axially from said article during rotation of said article, means coacting with said wrapping means to actuate said wrapping means and cause said rotation during travel thereof, means for feeding said article to said wrapping means, and means for supplying a wrapper between said article and said wrapping means.

4. In a wrapping machine, traveling wrapping means to support and cause rotation of an article to be wrapped, and comprising rotary means juxtaposed to said article in an axial direction therefrom to crimp a wrapper projecting axially from said article during rotation of said article, means coacting with said wrapping means to actuate said wrapping means and cause said rotation during travel thereof, means to press said article to said wrapping means during said rotation, and comprising longitudinal means juxtaposed to said article in an axial direction therefrom to crimp a wrapper projecting axially from said article during rotation of said article, means for feeding said article to said wrapping means, and means for supplying a wrapper between said article and said wrapping means.

5. In a wrapping machine, traveling wrapping means to rotatably support an article to be wrapped, pressing means to press said article to said wrapping means during rotation of said article, comprising successive separate sections, yieldable mountings for said sections, means for feeding said article to said wrapping means, and means for supplying a wrapper between said article and said wrapping means.

6. In a wrapping machine, traveling wrapping means to rotatably support an article to be wrapped, pressing means to press said article to said wrapping means during rotation of said article, a support for said pressing means preventing material longitudinal movement of said pressing means, but permitting said pressing means to move toward or from said wrapping means, means for feeding said article to said wrapping means, and means for supplying a wrapper between said article and said wrapping means.

7. In a wrapping machine, traveling wrapping means to rotatably support an article to be wrapped, pressing means to press said article to said wrapping means during rotation of said article, comprising a longitudinal flange juxtaposed to said article in axial direction therefrom to crimp a wrapper projecting axially from said article during rotation of said article, said article approaching said flange at one end of said flange, and said flange having its side adjacent to said article gradually increasingly inclined to the axis of said article from said end for a considerable distance along said flange, means for feeding said article to said wrapping means, and means for supplying a wrapper between said article and said wrapping means.

8. In a wrapping machine, traveling wrapping means to rotatably support an article to be wrapped, pressing means to press said article to said wrapping means during rotation of said article, comprising a flange juxtaposed to said article in axial direction therefrom to crimp a wrapper projecting axially from said article during rotation of said article, and a mounting for said flange on said pressing means permitting said flange to move toward and from said article in approximately axial direction, means for feeding said article to said wrapping means, and means for supplying a wrapper between said article and said wrapping means.

9. In a wrapping machine, traveling wrapping means to rotatably support an article to be wrapped, pressing means to press said article to said wrapping means during rotation of said article, comprising a flange juxtaposed to said article in axial direction therefrom to crimp a wrapper projecting axially from said article during rotation of said article, and a mounting for said flange on said pressing means permitting said flange to move toward and from said article in approximately axial direction, said article approaching said flange at one end of said flange and said flange having its side adjacent to said article gradually increasingly inclined to the axis of said article from said end for a considerable distance along said flange, means for feeding said article to said wrapping means, and means for supplying a wrapper between said article and said wrapping means.

10. In a wrapping machine, traveling wrapping means to rotatably support an article to be wrapped, pressing means to press said article to said wrapping means during rotation of said article, a support for said pressing means preventing material longitudinal movement of said pressing means but permitting said pressing means to move toward or from said wrapping means, said pressing means comprising a longitudinal flange juxtaposed to said article in axial direction therefrom to crimp a wrapper projecting axially from said article during rotation of said article, and a mounting for said flange on said pressing means permitting said flange to move toward and from said article in approximately axial direction, means for feeding said article to said wrapping means, and means for supplying a wrapper between said article and said wrapping means.

11. In a wrapping machine, traveling wrapping means to rotatably support an article to be wrapped, pressing means to press said article to said wrapping means during rotation of said article, a support for said pressing means preventing material longitudinal movement of said pressing means but permitting said pressing means to move toward or from said wrapping means, said pressing means comprising a longitudinal flange juxtaposed to said article in axial direction therefrom to crimp a wrapper projecting axially from said article during rotation of said article, and a mounting for said flange on said pressing means permitting said flange to move toward and from said article in approximately axial direction, said article approaching said flange at one end of said flange, and said flange having its side adjacent to said article gradually increasingly inclined to the axis of said article from said end for a considerable distance along said flange, means for feeding said article to said wrapping means, and means for supplying a wrapper between said article and said wrapping means.

12. In a wrapping machine, traveling wrapping means comprising a supporting roller and flanking rollers to rotatably support an article to be wrapped, one of said rollers comprising flanges flanking said article in axial direction therefrom to crimp a wrapper projecting axially from said article during said rotation, means for feeding said article to said wrapping means, and means for supplying a wrapper between said article and said wrapping means.

13. In a wrapping machine, traveling wrapping means comprising a supporting roller and flanking rollers to rotatably support an article to be wrapped, said supporting roller comprising flanges flanking said article in an axial direction therefrom to crimp a wrapper projecting axially from said article during said rotation, means for feeding said article to said wrapping means, and means for supplying a wrapper between said article and said wrapping means.

14. In a wrapping machine, traveling wrapping means comprising a plurality of rollers to rotatably support an article to be wrapped, means for feeding said article to said wrapping means, means for supplying a wrapper between said article and said wrapping means, and means comprised in said traveling wrapping means to throw one end of said wrapper around said article.

15. In a wrapping machine, traveling wrapping means to rotatably support an article to be wrapped, means for feeding said article to said wrapping means, means for supplying a wrapper between said article and said wrapping means, and means comprised in said traveling wrapping means to throw the advanced end of said wrapper around said article.

16. In a wrapping machine, traveling wrapping means to rotatably support an article to be wrapped, means for feeding said article to said wrapping means, means for supplying a wrapper between said article and said wrapping means, means comprised in said traveling wrapping means to throw the advanced end of said wrapper around said article, and pressing means to press said article and wrapper during travel of said wrapping means after said wrapper has been thrown around said article.

17. In a wrapping machine, traveling wrapping means to rotatably support an article to be wrapped, means for feeding said article to said wrapping means, means for supplying a wrapper between said article and said wrapping means, means comprised in said traveling wrapping means to throw the advanced end of said wrapper around said article, and pressing means to press said article and wrapper during travel of said wrapping means after said wrapper has been thrown around said article, said pressing means having a longitudinal groove along which travels said means that throws the wrapper around the article, and whereby this means is held against said wrapper during said travel.

18. In a wrapping machine, traveling wrapping means comprising a plurality of rollers to rotatably support an article to be wrapped, means for feeding said article to said wrapping means, means for supplying a wrapper between said article and said wrapping means, means comprised in said traveling wrapping means to throw one end of said wrapper around said article, and a projection on this throwing means engaged by said wrapper between said rollers and under the pressure of said article, to actuate the throwing means.

19. In a wrapping machine, traveling wrapping means to rotatably support an article to be wrapped, means for feeding said article to said wrapping means, means for supplying a wrapper between said article and said wrapping means, means comprised in said wrapping means to throw one end of said wrapper around said article, a projection on this throwing means engaged by said wrapper under the pressure of the article to initiate the action of said throwing means, engaging means connected to said throwing means, and stationary means to be engaged by said engaging means and complete the throwing of said throwing means.

20. In a wrapping machine, traveling wrapping means to rotatably support an article to be wrapped, means for feeding said article to said wrapping means, means for supplying a wrapper between said article and said wrapping means, means comprised in said wrapping means to throw one end of said wrapper around said article, a projection on this throwing means engaged by said wrapper under the pressure of the article to initiate the action of said throwing means, engaging means connected to said throwing means, and stationary means to be engaged by said engaging means and complete the throwing of said throwing means, a presser to press said article and wrapper after said wrapper has been thrown therearound, and engaging with said throwing means to hold it against said wrapper, said wrapping means emerging from under said pressing means to deliver said article in wrapped condition, and another stationary means to engage with the engaging means of said throwing means to remove said throwing means from said wrapped article and permit the delivery of said article.

21. In a wrapping machine, traveling wrapping means comprising a supporting roller and flanking rollers to rotatably support an article to be wrapped, throwing means pivoted coaxially with one of said flanking rollers, means for supplying a wrapper over said wrapping means, and means for feeding said article onto said wrapper over the space between said flanking rollers while said throwing means is remote from said space between said flanking rollers, means whereby said throwing means throws the advanced end of said wrapper around said article after said article has been fed thereon, and pressing means under which said wrapping means travels to press said article and wrapper to said wrapping means and to hold said throwing means against said wrapper.

22. In a wrapping machine, traveling wrapping means comprising a supporting roller and flanking rollers to rotatably support an article to be wrapped, throwing means pivoted coaxially with one of said flanking rollers, means for supplying a wrapper over said wrapping means, and means for feeding said article onto said wrapper over the space between said flanking rollers while said throwing means is remote from said space between said flanking rollers, means whereby said throwing means throws the advanced end of said wrapper around said article after said article has been fed thereon, and pressing means under which said wrapping means travels to press said article and wrapper to said wrapping means and to hold said throwing means against said wrapper, and means to disengage said throwing means from said wrapper after said wrapping means has passed from under said pressing means, whereby said article is discharged from said wrapping means.

23. In a wrapping machine, traveling wrapping means comprising a supporting roller and flanking rollers to rotatably support an article to be wrapped, throwing means pivoted coaxially with one of said flanking rollers, means for supplying a wrapper over said wrapping means, and means for feeding said article onto said wrapper over the space between said flanking rollers while said throwing means is remote from said space between said flanking rollers, means whereby said throwing means throws the advanced end of said wrapper around said article after said article has been fed thereon, and pressing means under which said wrapping means travels to press said article and wrapper to said wrapping means and to hold said throwing means against said wrapper, said pressing means comprising a longitudinal flange flanking said article axially to crimp said wrapper where it projects axially from said article, and means to deliver said article from said wrapping means after said wrapping means has passed from under said pressing means.

24. In a wrapping machine, traveling wrapping means to receive and wrap an article by rotating said article, a chute to successively supply the articles adjacent to said wrapping means at one stage of the travel of said wrapping means, a rotatable element at the lower end of said chute adjacent to said wrapping means, a pair of arms extending from said rotatable element at opposite sides of said chute and adapted to grip said articles as they are successively supplied by said chute and to carry said articles around into said wrapping means upon rotation of said element, means to rotate said element simultaneously with the travel of said wrapping means, means for supplying a wrapper between said element and said wrapping means while said wrapping means is coming into position to receive the article from said element, and means to press said article and said wrapper together in said wrapping means during subsequent travel thereof.

25. In a wrapping machine, traveling wrapping means comprising an elongated supporting roller and elongated flanking rollers on parallel axes substantially at right angles to the path of travel, and adapted to receive a row of substantially flat cylindrical articles with their flat sides together between said flanking rollers and upon said supporting roller, a chute supplying said articles in successive rows, a cylinder rotatably mounted on an axis parallel to the axes of said rollers, a pair of arms on said cylinder, the arms of said pair being at opposite ends of the cylinder and adapted to extend at opposite sides of said chute as said cylinder rotates, means whereby said arms are mounted to slide axially of said cylinder to grip a row of said articles when the arms slide toward each other and to release said articles when the arms slide apart, means for causing said arms to slide toward each other as they pass said chute, thereby gripping a row of said articles and carrying them around into said wrapping means, means to cause said arms to slide apart as they place said articles in said wrapping means, means for supplying a wrapper between said cylinder and said wrapping means while said wrapping means is coming into position to receive said articles, means for rotating said cylinder simultaneously with the travel of said wrapping means, and means to press said articles and said wrapper together in said wrapping means during subsequent travel thereof.

26. In a wrapping machine, traveling wrapping means comprising an elongated supporting roller and elongated flanking rollers on parallel axes substantially at right angles to the path of travel, and adapted to receive a row of substantially flat cylindrical articles with their flat sides together between said flanking rollers and upon said supporting roller, a chute supplying said articles in successive rows, said chute comprising an upwardly extended lower end and having its sides open above said lower end, a cylinder rotatably mounted whereby said lower end is substantially tangent to its surface, a pair of arms, the arms of said pair being at opposite ends of said cylinder and being slidably mounted thereon to move toward or from each other, means to cause said arms to slide toward each other as they pass the open sides of said chute and thereby grip a row of said articles and carry said row around into said wrapping means, means to cause said arms to slide apart as they place said articles in said wrapping means, means for supplying a wrapper between said cylinder and said wrapping means while said wrapping means is coming into position to receive said articles, means for rotating said cylinder simultaneously with the travel of said wrapping means, and means to press said articles and said wrapper together in said wrapping means during subsequent travel thereof.

27. In a wrapping machine, traveling wrapping means comprising an elongated supporting roller and elongated flanking rollers on parallel axes substantially at right angles to the path of travel, and adapted to receive a row of substantially flat cylindrical articles with their flat sides together between said flanking rollers and upon said supporting roller, a chute supplying said articles in successive rows, a cylinder mounted adjacent to the lower end of said chute and to said wrapping means to rotate on an axis parallel with the axes of said rollers, said cylinder having coaxial cylindrical extensions at its opposite ends, arms at opposite ends of said cylinder, each comprising a segmental bearing part against the respective extension, and the arm extending radially outward past the surface of said cylinder, shanks on said arms, said cylinder having a bore receiving said shanks, a tension spring within said bore connecting said shanks and yieldably holding said arms toward each other as guided by said extension, stationary segmental cams at opposite ends of said cylinder adjacent to said wrapping means, said cams having surfaces which, when engaged by the respective arms, cause said arms to slide apart until they pass at opposite sides of said chute and then permit said arms to be drawn together by said spring to grip said articles, and thereby carry said articles around with the articles resting on the surface of said cylinder and depositing said articles in said wrapping means as it passes under said cylinder, means for supplying a wrapper between said cylinder and said wrapping means while said articles are being brought around thereto, means for rotating said cylinder simultaneously with the travel of said wrapping means, and means for pressing said articles and said wrapper in said wrapping means during subsequent travel thereof.

28. In a wrapping machine, traveling wrapping means to receive and wrap an article by rotating said article, a chute inclined over said wrapping means and having an upwardly projected lower end and having its sides open next to said lower end, a cylinder rotatably mounted to turn on an axis substantially at right angles to the direction of travel of said wrapping means and with the upper edge part of said lower end of said chute substantially tangent to said cylinder, axially slidable arms on said cylinder at opposite ends thereof, means for causing said arms to slide in and grip an article exposed at an open side of said chute and against said lower end of said chute, said cylinder and its arms being adapted to carry said article around and deposit it in said wrapping means, means for causing said arms to slide apart as they deposit said article in said wrapping means, means for supplying a wrapper between said cylinder and said wrapping means while said wrapping means is approaching said cylinder, means for rotating said cylinder simultaneously with the travel of said wrapping means, and means for pressing said wrapper and said article together in said wrapping means during subsequent travel thereof.

29. In a wrapping machine, a rotor, a series of wrapping means arranged around the periphery of said rotor, each one of said wrapping means being adapted to rotatably support an article to be wrapped, means coacting with said wrapping means as they are carried around on said rotor to actuate said wrapping means and cause rotation of the article, a segmental presser along the path of said wrapping means, means whereby material circumferential movement of said presser is prevented, but whereby said presser bears on said article and presses it to said wrapping means during said rotation of said article, means for feeding said article to said wrapping means, and means for supplying a wrapper between said article and said wrapping means.

30. In a wrapping machine, a rotor, a series of wrapping means arranged around the periphery of said rotor, each one of said wrapping means being adapted to rotatably support an article to be wrapped, means coacting with said wrapping means as they are carried around on said rotor to actuate said wrapping means and cause rotation of the article, a segmental presser along the path of said wrapping means, means whereby material circumferential movement of said presser is prevented, but whereby said presser bears on said article and presses it to said wrapping means during said rotation of said article, means for feeding said article to said wrapping means, means for supplying a wrapper between said article and said wrapping means, said wrapping means comprising throwing means to throw one end of said wrapper around said article before said article is carried into contact with said pressing means, and engaging means connected to said throwing means and means along the path of said wrapping means for causing said throwing means to throw said wrapper around said article, and for releasing said throwing means from said article after said wrapping means has passed from under said pressing means, whereby said article is delivered.

31. The combination with two wrapping machines in series, of a conveyor between said machines comprising an upwardly traveling series of blades, a chute delivering wrapped packages from one of said machines onto said blades in the lower part of said conveyor, and a chute on the other machine receiving said packages from said blades in the upper part of said conveyor and delivering said packages to said second machine to receive a second wrapper or label.

PAUL VARGA.

Witnesses:
JAMES N. RAMSEY,
CLARENCE PERDEW.